May 1, 1951 J. M. GORDON 2,550,804
CONTAINER
Filed April 27, 1946 2 Sheets-Sheet 1
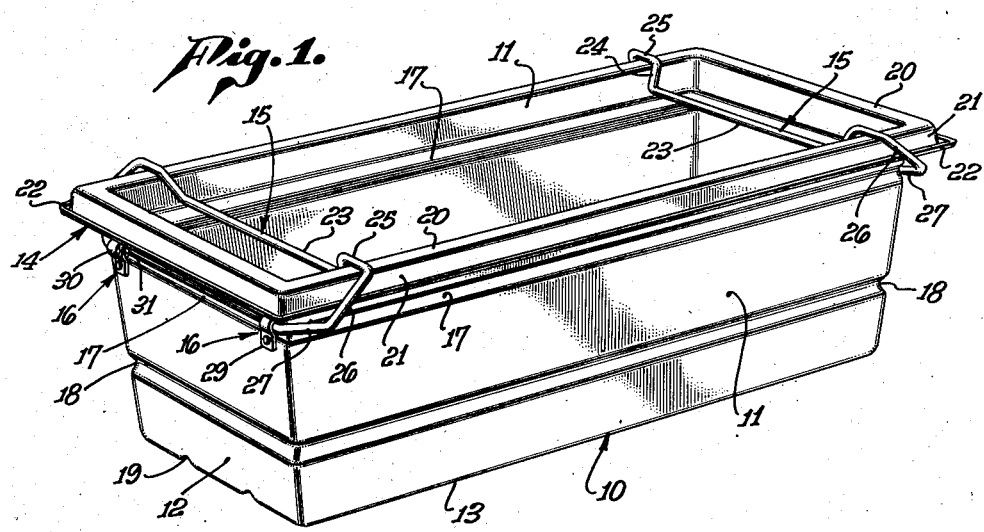
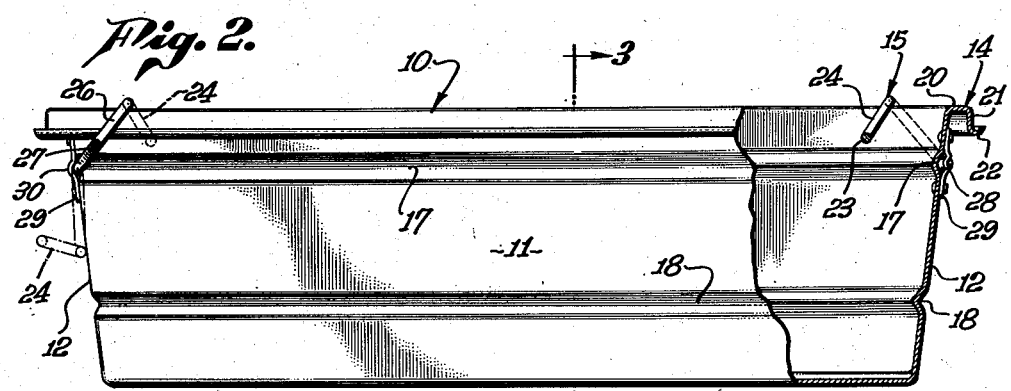
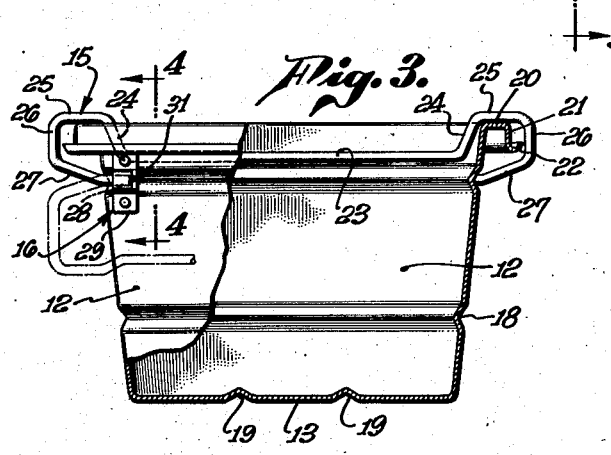
INVENTOR
James M. Gordon
BY
P. C. Weilein
ATTORNEY May 1, 1951          J. M. GORDON          2,550,804
CONTAINER
Filed April 27, 1946          2 Sheets-Sheet 2
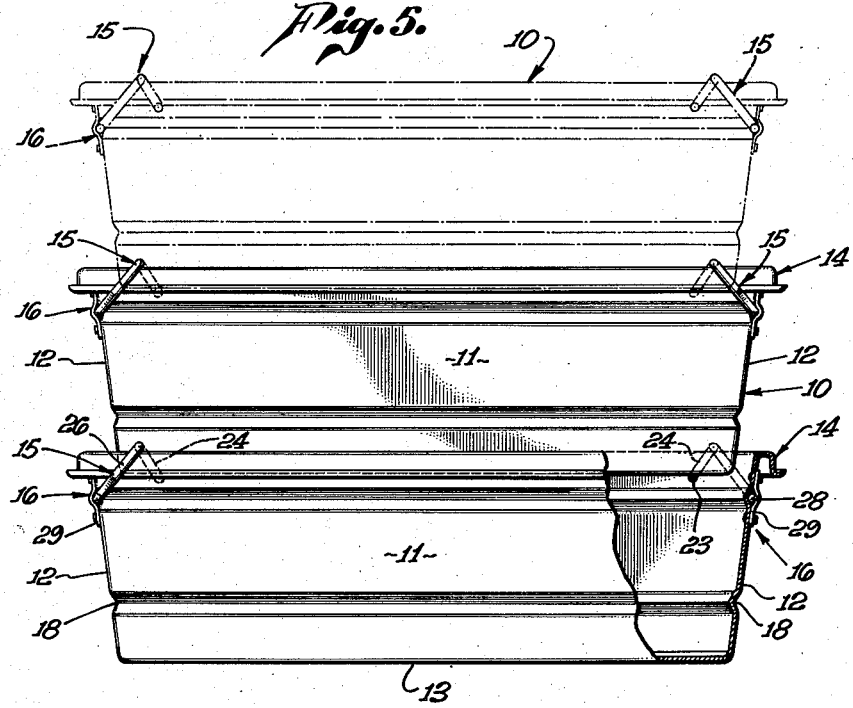
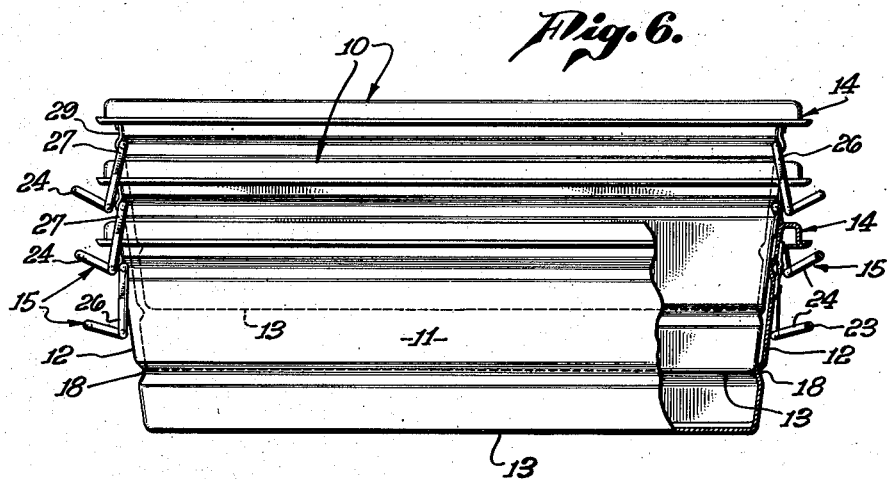
INVENTOR
James M. Gordon
BY
ATTORNEY Patented May 1, 1951

2,550,804

UNITED STATES PATENT OFFICE 2,550,804

CONTAINER

James M. Gordon, Los Angeles, Calif.

Application April 27, 1946, Serial No. 665,458

6 Claims. (Cl. 220—97)

This invention relates to receptacles or containers and more particularly to that type of receptacle used in the meat packing industry for storing or conveying cut meats, and known in the industry as a meat lug.

Previously, wooden meat lugs have been utilized for the shipping and storage of cut meats, but several disadvantages have made them expensive to use and difficult to maintain. Wood, being porous, tends to absorb fluids originating in the meats, breaking down the wood itself, swelling and expanding the joints, and making the task of maintaining the lugs in a clean and sanitary condition a very difficult one. In an effort to obviate the contact of the meats with the lugs, they have been lined with moisture resistant paper, an obviously expensive and labor consuming expedient.

Heavy usage and the deteriorating factors described above have made the maintenance of the lugs expensive. Further, because of the weight of the lugs, they are difficult to handle and move about. When nested one within the other, they are hard to separate, and the instruments used in prying the lugs apart frequently cause damage which adds to the expense of maintaining the lugs. Distorted frames and swelled joints make accurate stacking and nesting difficult indeed and wooden lugs so stacked or nested are in constant danger of toppling over.

Therefore, it is an object of this invention to provide a meat lug which is light, strong and moisture proof and adapted to be easily and cheaply maintained.

A further object of this invention is the provision of a meat lug so designed and constructed that it can be readily cleaned and easily kept in a sanitary condition.

Another object of this invention is the provision of meat lugs adapted to be stacked one upon the other and when so stacked to be maintained in constant and non-shifting alignment, thus eliminating toppling of the lugs.

An additional object of this invention is the provision of meat lugs which can be nested one within the other when not in use but so constructed that they can be readily separated when they are to be used.

A further object of this invention is the provision of a meat lug through which air may circulate when it is loaded and stacked under another similar lug.

Another object of this invention is the provision of a meat lug which is, when nested within similar lugs, adapted to be lifted concomitantly with the other lugs by the provision of means which hold the lugs in nested relationship to each other.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 1 is a perspective view of a meat lug embodying this invention and shown with its handles positioned to support another lug stacked thereupon;

Figure 2 is a side elevational view of the lug, partly in section;

Figure 3 is an end elevational view of the lug, with a section taken on line 3—3 of Figure 2;

Figure 4 is a detailed sectional view taken on line 4—4 of Figure 3;

Figure 5 is a side elevational view showing a plurality of the lugs stacked one upon the other, with the bottom lug being shown partially in section; and Figure 6 is a side elevational view showing the lugs nested one within the other, with the lowermost lug shown partially in section.

A meat lug embodying the invention is shown in the drawings and comprises a receptacle 10 having side walls 11, end walls 12, and a bottom 13. A peripheral flange 14 bounds the top of the lug, imparting strength and rigidity to it and being adapted to cooperate with handle means 15 which can be used for stacking purposes and which are mounted on the end walls 12.

The body of the lug is designed to be formed from a single sheet of lightweight, non-rusting and corrosion resisting material, such as aluminum, in the shape of a frusto-pyramid, with the side walls 11 and the end walls 12 flaring out from the bottom 13 so that the opening embraced by the peripheral flange 14 is larger in area than the bottom 13. An instruck, triangular bead or rib 17 situated immediately below the peripheral flange 14 strengthens the side walls 11 and the end walls 12, serving in addition to assist in rotatably mounting the handles or stacking means 15 on the end walls 12.

Somewhat below the stiffening rib 17 there is provided a deeper additional instruck triangular rib 18, adapted both to further strengthen the side walls 11 and end walls 12, and to serve as a seat or nesting means upon which the bottom 13 of another lug identical to the one described can be placed, when the lugs are nested one within the other. It is, of course, understood that the side walls 11 and the end walls 12 so meet with the bottom 13 that an accurate registry with the instruck bead or rib 18, which will neither bind nor permit undesirable looseness, is provided. The rib 17 is of such height as to engage the walls of the inserted container when supported on the rib 17, thus providing additional restraint against looseness.

To permit ease of lifting and to facilitate the sanitary maintenance of the lug, the peripheral flange 14 is formed with a flat portion 20 extending outwardly from the side and end walls 11 and 12, said flat portion having a portion 21 directed downwardly therefrom and terminating in an upturned, outwardly directed lip or bead 22. Thus, no sharp edges which would render lifting difficult, or inaccessible corners which would prevent thorough cleansing, are to be found in the flange. In addition, of course, the shape of the peripheral flange 14 enables it to serve as an adjunct to the handle or stacking means 15 in both their stacking and nesting functions.

The handles 15, preferably formed of light rod stock, are rotatably mounted in the grooves formed in the outside of the end walls 12 by the instruck rib 17 and have their ends 28 retained for rotation therein by means of clips or mounts 16, which comprise flat portions 29 fastened to the end walls 12 immediately above and below the groove formed by the instruck rib 17 and curved or bowed out portions 30 overlying the grooves against which the ends 28 of the handle means 15 rotate. To keep the ends 28 of the handle means 15 from being laterally displaced or shifted in their mounts 16, instruck, triangularly shaped segments or projections 31 are formed integrally with the mounting means 16 on the inner side of, and immediately adjacent to the bowed out portion 30.

From the ends or pintles 28 of the handle means 15, there extend handle segments 27 which are outwardly directed at an upward angle under the peripheral flange 14 and run into segments 26 which rise at an angle in a plane parallel to the sides 21 of the peripheral flange 14. From the segments 26 there run segments 25 which lie transversely across the flat portion 20 of the flange 14 in a bearing relationship thereto. Extending downwardly from the segments 25 and at an angle thereto are segments or offsets forming spaced shoulders 24 between which runs the straight middle portion or segment 23, which bridges the top of the lug and is designed to act as the stacking surface when the lugs are placed in stacked relationship to each other. The offsets or shoulders 24 are separated by a distance substantially equal to the width of the bottom of a lug, so as to accurately position a lug supported in the means 15, by engaging the opposite sides thereof. As can be seen from the drawings, the angular configuration of the handle means 15 enables it to serve as a seat for the bottoms of identical lugs when the lugs are stacked, by causing the straight portion or segment 23 to bridge or lie across the open top of the lug. When the straight segment 23 bridges the top of the lug, segments 25 are adapted to bear on the peripheral flange 14. Since as just pointed out, and as shown in Fig. 3, the offset portions 24 extend upwardly at a sharp angle immediately adjacent the sides of a lug supported on the segment 23, and join the respective segments 25 immediately adjacent the inner edge of the flange 14, the loads borne on segment 23 are distributed into the structure of the lug substantially entirely by tension in the offsets 24, thus avoiding the creation of severe bending forces in the element 15.

Conversely, when the handle means 15 is rotated out of engagement with the top of the lug and is rotated into a position below the peripheral flange 14, the handle means lie adjacent the exterior of the end walls 12 of the lug and the straight segments 23 of the handle means are adapted to be grasped and used to pick up or otherwise move the lug. When the handle means 15 are being utilized to stack another lug thereupon, the peripheral flange 14 is adapted to be used to grasp the lug.

When a number of lugs are nested one within the other, segments 23, 25 of the handles 15 of one lug will hang under the peripheral flange 14 of the lug next below. Thus, when the top lug of a number of nested lugs is picked up by its peripheral flange 14, the other lugs will be retained in a nested relationship thereto because of the engagement of the segments 25 under the peripheral flanges 14 of the next lower lug.

Since the circulation of refrigerated air over the contents of the lugs when they are loaded and stacked one upon the other is desirable, the stacking means 15 and more particularly the segments 23 are so dimensioned that when the bottom of another lug is stacked thereupon an air gap will lie between the interior of the lug and the bottom 13 of the lug stacked thereupon. Through this gap refrigerated air may be circulated and the danger of spoilage to the contents of the lugs obviated. Thus, it can be seen that it is absolutely necessary that the handle means be restrained from lateral shifting by the restraining means 31 so that the air gap may be maintained at a substantially constant dimension about the bottom of the lug. Further, the handles 15 are restrained from lateral shifting so that the lugs placed thereupon when the handle means 15 are used for stacking purposes will always be directly over the center of the lug below, to avoid the possibility that the stacked lugs may topple over.

It is also intended that a lug, when nested within another lug and resting on the nesting means 18 and engaging the rib 17, will not be either wedged tightly therein, nor, on the other hand, fit so loosely that one lug can slip within the other, with the possibility that when a large number of lugs have been nested, they may shift in relationship to one another and cause the pile to topple over. The fact that the lugs are not wedged tightly one into the other when nested facilitates their separation and eliminates the necessity for their separation by forcible means.

Since both the handle segments 23 and the nesting means 18 must accurately fit the bottoms 13 of lugs placed thereupon it can readily be seen that the outer limits of the stacking means 15 and the nesting means 18 lie in substantially the same vertical plane and on the same straight vertical line extending from the bottom to the top of the lug.

I claim:

1. In an open top container having flaring side and end walls, and a bottom, said walls having exterior flanges providing transverse surfaces; a pair of elements having transversely extending portions adapted to bridge said container, as well as radially directed arms adjacent the opposite ends of said element; and means mounting said elements respectively adjacent the opposite ends of said container for optional angular movement about the ends of said arms between positions in which said portions are supported on said flanges and in which said portions lie adjacent said end walls said container being adapted to be supported in definite nested relation in a similar container, the radius of said arms being such as to cause said portion when swung to a position adjacent said end wall of the first mentioned container to pass below the flange on said similar container, whereby lifting force acting on the first mentioned container will be transmitted to said similar container.

2. In an open top container having flaring side and end walls, and a bottom, said walls having exterior flanges providing transverse surfaces; a pair of elements having transversely extending portions adapted to bridge said container, as well as radially directed arms adjacent the opposite ends of said element; means mounting said elements respectively adjacent the opposite ends of said container for optional angular movement about the ends of said arms between positions in which said portions are supported on said flanges and in which said portions lie adjacent said end walls between said flanges; said portions when supported on said flanges being adapted to support a similar container in stacked relation with the first mentioned container; means forming transversely spaced shoulders on each of said portions for engaging the sides of said stacked container and maintaining it positioned with respect to the opening of said first mentioned container; said first mentioned container being adapted to be supported in definite nested relation in a similar container, the radius of said arms being such as to enable said portion to pass below the flanges on said last mentioned container, whereby lifting force acting on the first mentioned container will be transmitted to said last mentioned container by engagement of said portions with the flanges on said last mentioned container.

3. In an open top container having flaring side and end walls and a bottom, said walls having exterior flanges providing transverse surfaces; a pair of elements having transversely extending portions adapted to bridge said container, said portions having a central zone providing spaced offsets, as well as radially directed arms adjacent the opposite ends of said element; means mounting said elements respectively adjacent the ends of said container for optional angular movement about the ends of said arms to a position in which said portions are supported on said flanges and to a position in which said portions lie adjacent said end walls; said zone, when said portions rest on said flanges, being adapted to support a similar container in stacked relation with the first mentioned container, said offsets extending within said container and serving by engagement with the sides of said similar container to maintain it spaced in the opening of the first mentioned container; said first mentioned container being adapted to be supported in definite nested relation in a similar container, the radius of said arms being such as to enable said portion to pass below the flanges on said last mentioned container, whereby lifting force acting on the first mentioned container will be transmitted to said last mentioned container by engagement of said portions with the flanges on said last mentioned container.

4. In an open top container having flaring side and end walls, and a bottom; means providing an exterior transverse surface adjacent the upper edge of each end wall; a pair of elements respectively having portions extending transversely of said container as well as radially directed arms adjacent their opposite ends; means mounting said elements respectively adjacent the opposite ends of said container for optional angular movement about the ends of said arms to and from lower positions in which said portions lie adjacent said end walls, said container being adapted to be supported in nested relation in a similar container, the radius of said arms being such that said portions of the elements when swung toward their lower position are adapted to pass below said surface forming means on said similar container, whereby lifting of the first mentioned container will exert a lifting force on the similar container.

5. In combination: a pair of open top containers adapted to nest one within the other, each of said containers having flaring side and end walls, and a bottom; means providing an exterior transverse surface adjacent the upper edge of each end wall; pairs of elements respectively having portions extending transversely of each container as well as radially directed arms adjacent their opposite ends; means mounting said elements respectively adjacent the opposite ends of said containers for optional angular movement about the ends of said arms to and from lower positions in which said portions lie adjacent said end walls; means supporting said containers when nested, in definite spaced relation, the radius of said arms being such that said portions of the elements on the upper container when swung toward their lower position are adapted to pass below said surface forming means on the lower container, whereby lifting of the upper container will exert a lifting force on the lower container, said elements being optionally swingable past said surface forming means on the lower container to permit lifting of the upper container only.

6. In combination: a pair of open top containers adapted to nest one within the other, each of said containers having flaring side and end walls, and a bottom; means providing an exterior transverse flange adjacent the upper edge of each end wall; pairs of elements respectively having portions extending transversely of each container, adapted to rest on said flanges and bridge the container, as well as radially directed arms adjacent their opposite ends; means mounting said elements respectively adjacent the opposite ends of said containers for optional angular movement about the ends of said arms between bridging positions and positions in which said portions lie adjacent said end walls; said transverse portion of said elements on one container when in bridging position, being adapted to support the other container in stacked relation on said one container; means supporting said containers when nested, in definite spaced relation, the radius of said arms being such that said portions of the elements on the upper container when swung toward their lower position are adapted to pass below said flange forming means on the lower container, whereby lifting of the upper container will exert a lifting force on the lower container, said elements being optionally swingable past said flange forming means on the lower container to permit lifting of the upper container only.

JAMES M. GORDON.

REFERENCES CITED

The following references are of record in the file of this patent:

UNITED STATES PATENTS

| Number | Name | Date |
|---|---|---|
| D. 149,809 | Gordon | June 1, 1948 |
| 1,016,346 | Markee | Feb. 6, 1912 |
| 1,079,903 | Norton | Nov. 25, 1913 |
| 1,653,579 | Marko | Dec. 20, 1927 |
| 2,061,414 | Tufts et al. | Nov. 17, 1936 |
| 2,087,944 | Brown | July 27, 1937 |
| 2,088,181 | Swift | July 27, 1937 |
| 2,105,179 | Best et al. | Jan. 11, 1938 |
| 2,121,944 | Best et al. | June 28, 1938 |
| 2,288,602 | Benton | July 7, 1942 |
| 2,293,966 | Best | Aug. 25, 1942 |
| 2,297,097 | Best | Sept. 29, 1942 |
| 2,395,542 | Fordon | Feb. 26, 1946 |

FOREIGN PATENTS

| Number | Country | Date |
|---|---|---|
| 69,217 | Norway | Aug. 24, 1942 |